US009097386B2

(12) United States Patent
Phillips et al.

(10) Patent No.: US 9,097,386 B2
(45) Date of Patent: Aug. 4, 2015

(54) PORTABLE WORK SCREEN WITH AT LEAST TWO SUPPORTS COMPRISING MAGNETS AND A SEMI RIGID SCREEN

(75) Inventors: Mark Wayne Phillips, Barrow-in-Furness (GB); William Brian Spencely, Barrow-in-Furness (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/110,386

(22) PCT Filed: Mar. 22, 2012

(86) PCT No.: PCT/GB2012/050626
§ 371 (c)(1),
(2), (4) Date: Oct. 7, 2013

(87) PCT Pub. No.: WO2012/136979
PCT Pub. Date: Oct. 11, 2012

(65) Prior Publication Data
US 2014/0020855 A1 Jan. 23, 2014

(30) Foreign Application Priority Data

Apr. 7, 2011 (EP) .................................... 11275060
Apr. 27, 2011 (GB) .................................. 1105853.4

(51) Int. Cl.
*A47G 5/00* (2006.01)
*F16P 1/06* (2006.01)
(Continued)

(52) U.S. Cl.
CPC . *F16P 1/06* (2013.01); *B23K 9/321* (2013.01); *B23K 37/006* (2013.01); *B23Q 11/0891* (2013.01)

(58) Field of Classification Search
CPC . G09F 15/0031; G09F 15/0056; E04G 21/24; E04G 21/28; E04G 21/30; E04G 2/74; F16P 1/06; B23K 37/006; B23K 9/321; B23Q 11/0891
USPC ............. 160/352, 351, 135; 40/606.12, 607.1
See application file for complete search history.

(56) References Cited

U.S. PATENT DOCUMENTS 2,491,957 A 12/1949 Dilley
2,825,268 A 3/1958 De Mambro et al.
(Continued)

FOREIGN PATENT DOCUMENTS

AU 2008-200652 A 4/2007
CN 2 434 089 Y 6/2001
DE 20 2009 005125 U1 10/2009

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Oct. 17, 2013, issued in corresponding International Application No. PCT/GB2012/050626 (5 pgs.).
(Continued)

*Primary Examiner* — Katherine Mitchell
*Assistant Examiner* — Johnnie A Shablack
(74) *Attorney, Agent, or Firm* — Finch & Maloney PLLC

(57) ABSTRACT

A portable work screen apparatus including a semi-rigid screen and at least two supports, each having an attachment device, the attachment device having a magnet for, in use, releasably connecting the screen to a surface proximal to a workpiece, wherein the at least two supports are spaced apart, such that, in use, the screen is extending therebetween and is flexed to a desired configuration.

9 Claims, 3 Drawing Sheets

(51) Int. Cl.
   *B23K 9/32*   (2006.01)
   *B23K 37/00*  (2006.01)
   *B23Q 11/08*  (2006.01)

(56) References Cited

U.S. PATENT DOCUMENTS

| | | | |
|---|---|---|---|
| 2,911,038 A * | 11/1959 | Frommelt | 160/351 |
| 3,703,124 A | 11/1972 | Smith et al. | |
| 4,407,319 A * | 10/1983 | Shultz et al. | 135/87 |
| 4,527,540 A * | 7/1985 | Ryan et al. | 126/42 |
| 4,543,021 A | 9/1985 | Adler | |
| 4,865,490 A | 9/1989 | Wallace | |
| 5,026,219 A | 6/1991 | Wallace | |
| 5,056,969 A | 10/1991 | Nerland et al. | |
| 5,771,954 A * | 6/1998 | Benner et al. | 160/231.2 |
| 5,854,461 A | 12/1998 | Sorenson | |
| 6,161,590 A | 12/2000 | Wulff | |
| 6,390,741 B1 | 5/2002 | Jaeger | |
| 6,622,771 B2 * | 9/2003 | Plockmeyer | 160/352 |
| 6,892,486 B2 * | 5/2005 | Haggard, Jr. | 40/604 |
| D536,540 S * | 2/2007 | Partridge | D6/332 |
| 7,302,768 B2 * | 12/2007 | Gajdacs | 40/591 |
| 7,866,074 B2 * | 1/2011 | McComb et al. | 40/606.01 |
| 8,832,980 B2 * | 9/2014 | Hill | 40/606.12 |
| 2006/0060310 A1 * | 3/2006 | Haugen | 160/135 |
| 2008/0276927 A1 * | 11/2008 | Martin | 126/547 |
| 2009/0183407 A1 * | 7/2009 | Bidawid | 40/606.01 |
| 2011/0180679 A1 * | 7/2011 | Ma | 248/346.01 |
| 2013/0180674 A1 * | 7/2013 | Fredin | 160/351 |
| 2013/0329162 A1 * | 12/2013 | Fujii et al. | 349/58 |

OTHER PUBLICATIONS

International Search Report (PCT/ISA/210) mailed on Jul. 17, 2012, by the European Patent Office as the International Searching Authority for International Application No. PCT/GB2012/050626.
European Search Report for EP 11275060.9 dated Sep. 9, 2011.
United Kingdom Search Report for GB 1105853.4 dated May 16, 2011.

* cited by examiner

PORTABLE WORK SCREEN WITH AT LEAST TWO SUPPORTS COMPRISING MAGNETS AND A SEMI RIGID SCREEN

The present invention relates to a portable work screen, such as a welding screen.

Work operations such as welding, particularly arc welding, produce hazardous radiation damage in the form of ultraviolet radiation (UV), infrared radiation (IR) and intense visible light. Welding also produces heat, flames and sparks. Welders usually wear welding masks, helmets or goggles including protective "welding filter" lenses to prevent radiation damage to the eyes. Welding screens are typically also used to shield adjacent areas from welding radiation and, optionally, to contain sparks or flames. Welding screens may also be used to shield cutting or grinding operations by containing sparks or other debris.

Conventional work/safety screens of this type are in the form of a free standing/ground-based rigid screen or a hanging welding curtain. Such screens or curtains are typically "full height", for example 1.8 m (6 ft), and so are not usable in confined spaces and can be cumbersome to transport. It may not be possible to locate such screens close to the workpiece. Conventional free-standing screens can also be unstable and only usable on fairly level horizontal surfaces.

Embodiments of the present invention are intended to provide a portable screen that may be used in situations where a conventional screen is not practical.

According to one aspect of the present invention there is provided a portable work screen apparatus including a semi-rigid screen and at least two supports, each comprising an attachment device, said attachment device comprising a magnet for, in use, releasably connecting the screen to a surface proximal to a workpiece, wherein said at least two supports are spaced apart, such that, in use, said screen extending therebetween and is flexed to a desired configuration.

The supports may therefore be located on or near the work piece and arranged to provide the desired protection. A fixed rigid screen will only provide the protection behind the area of the screen, it cannot be readily adapted to provide a different shape to account for curved or non-linear work pieces. The ability to shape the semi rigid, ie flexible work screen removes the need for using a plurality of fixed screens to provide the same level of protection from hazards.

The semi rigid screen may be readily shaped from a substantially linear screen to one that has a curved arrangement, such as, for example concaved or convexed, or if required a wave like configuration.

The support may include a base portion, the attachment device being mounted on the base portion. The attachment device may be rigidly attached to the base portion. Alternatively, the attachment device may be adjustable, or may have a predetermined range of motion to enable self alignment.

The support can further include an arm extending from the base portion, the screen being mounted on the arm. The arm may be in substantially perpendicular alignment to the attachment plane of the attachment device. It will be appreciated that the attachment plane of the attachment device is, in use, the plane of the surface the device engages. The support may have an L-shaped profile.

The apparatus may include a handle, which may be connected to the, or each, support. The handle may be aligned with the attachment device.

The screen may comprise a semi-rigid screen. The screen may comprise a plastic sheet. In some embodiments the screen is an acetate. The screen can be at least partially transparent (or may be opaque) and may filter ultraviolet radiation (UV) and/or infrared radiation (IR) and/or intense visible light.

The screen can be removably fastened to the support. The screen may be interchangeable such that a user can select a screen of a suitable size for a particular task.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, an embodiment thereof will now be described, reference being made to the accompanying drawings in which.

Figure 1:
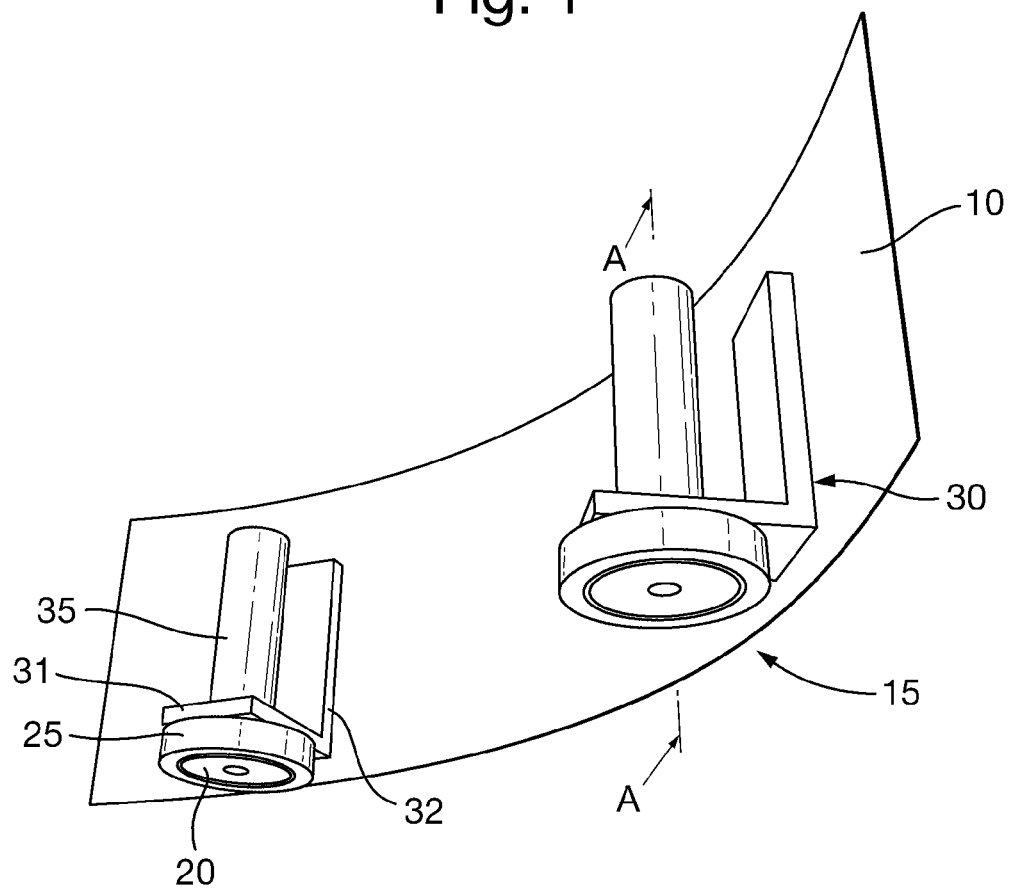
FIG. 1 is a schematic perspective view of a welding screen apparatus according to an embodiment of the invention.

As shown in FIG. 1, a portable work screen apparatus 1 according to an embodiment of the invention comprises a pair of supports 5 connected at spaced apart locations to a screen 10. The screen may be formed of any suitable material but is preferably thin acetate sheet, which may be at least partially transparent. The skilled person will appreciate that the screen should preferably meet any statutory requirements for welding safety equipment, for example the screen may filter Ultraviolet radiation (UV) and/or Infrared radiation (IR) and/or intense visible light.

The screen 10 is semi-rigid in that it is able to be self supporting over at least some of its length (i.e. away from the supports 5) but, as explained in further detail below, may be elastically deformed in use to take a desired shape. To allow for deformation the acetate sheet may have a thickness of approximately 1 mm or less. Each support 5 is provided with an attachment device 15, which in the illustrated embodiment is a magnet 25. Other attachment means, for example suction cups, or reusable adhesives, may provide similar functionality. An advantage of a magnetic attachment device is that magnets are generally robust. The attachment device 15 comprises a cup shaped cover 20 containing an annular magnet 25. The magnet 25 may be held in the cover 20 by any convenient means. For example, it may be bonded into the cover 20 using a suitable adhesive. Each support 5 comprises an L-shaped body 30 having a base portion 31 to which the attachment device 15 is connected and an arm 32 to which the screen 10 is attached.

Figure 2:
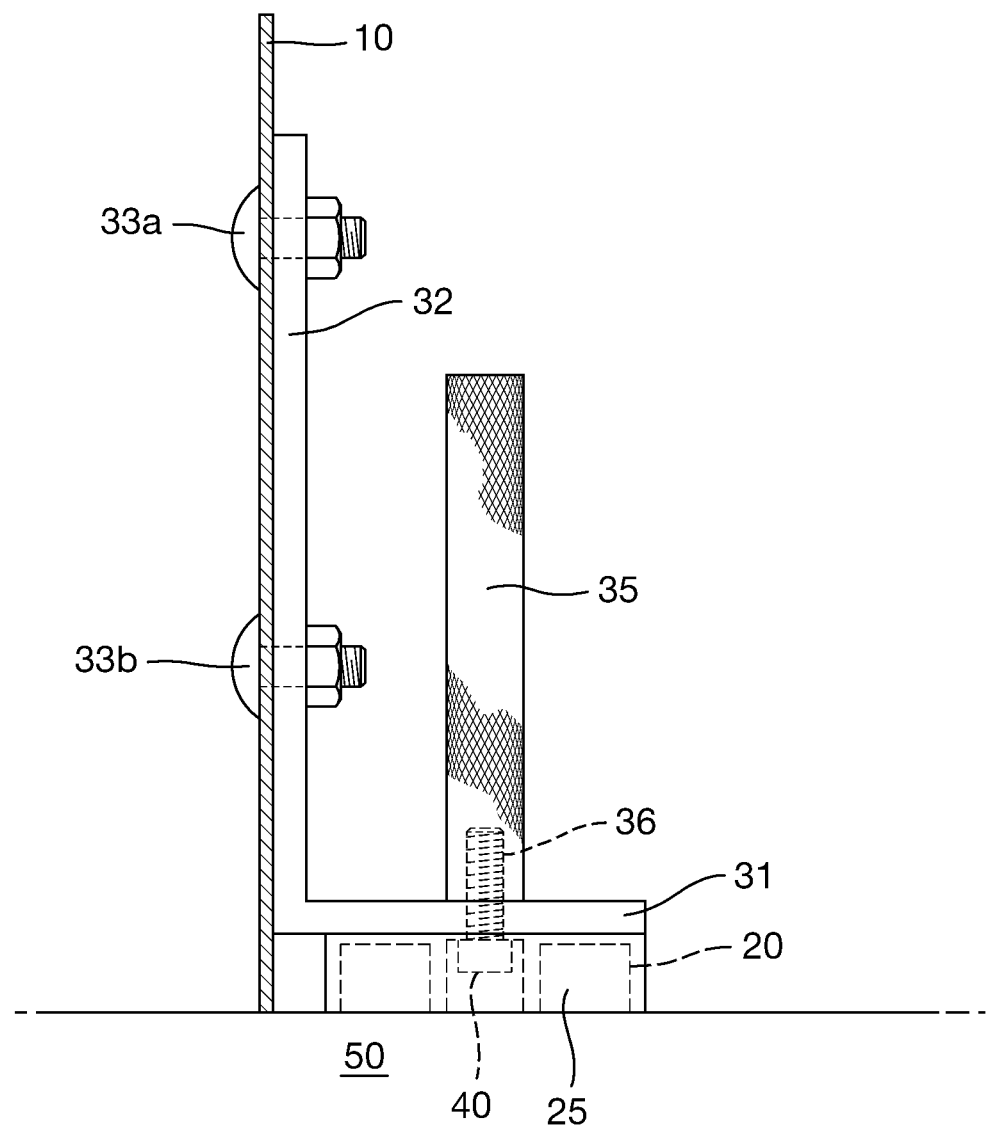
FIG. 2 is a schematic cross-sectional diagram through the line A-A of FIG. 1.

As best seen in the cross section of FIG. 2, the screen 10 is connected to the arm 32 via a pair of bolts 33A, 33B. The skilled person will appreciate that other attachment means may be utilised, including permanent attachments such as bonding. An advantage of a removable fastening between the screen 10 and the support 5 is that the screen may be replaced for example, in the event of damage, to adjust the length of the screen or to substitute for a screen for a particular type of operation (for example, a specific grinding or welding screen could be used). The illustrated embodiment may be used with a screen having dimensions of approximately 200 mm in height (measured in the direction of the arm 32) by 300 mm in width, although it will be understood that it is possible to provide further screen(s) of any desired length and/or height.

A handle 35 in the form of a knurled rod is also connected to the base portion 31 of the support 5. The handle includes a threaded bore 36 at one end. A screw 40 connects the magnet holder cover 20 to the handle 35 via a hole in the base 31 of the support body 30. Thus, the attachment device 15 and the handle 35 are rigidly attached to the body 30 of the support 5. An advantage of connecting the attachment device 15 via the handle 35 is that the handle is aligned with the attachment device enabling accurate positioning of the attachment device 15.

In use, the portable screen apparatus 1 is placed on a surface 50 close (e.g. less than 0.5 meter away, but in general as close to the workpiece as the operator feels comfortable and which will not disrupt the welding operation) to a workpiece (not shown) with the attachment devices 15 releasably engaging the surface. As the attachment devices 15 positively engage the surface 50 to retain the screen apparatus in place the portable screen apparatus 1 may be used in any orientation (including inverted). The surface 50 defines an attachment plane of the attachment device 15. The base 31 of the support 5 is substantially aligned with the attachment plane. The arm 32 of the support 5 extends in a generally perpendicular direction from the attachment plane and defines the alignment of the screen 10. It will be noted that the screen 10 can extend below the base 31 so that it abuts the surface 50.

Figure 3A:
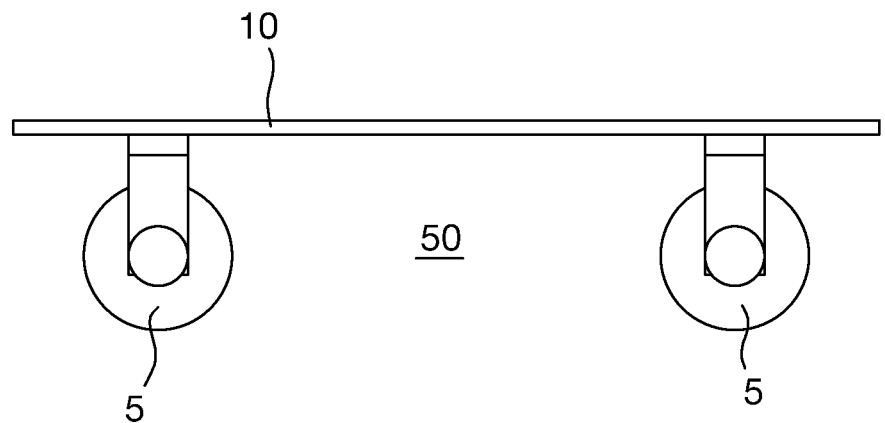
FIGS. 3A and 3B are schematic plan views of an embodiment in straight and arced configurations, respectively.
Figure 3B:
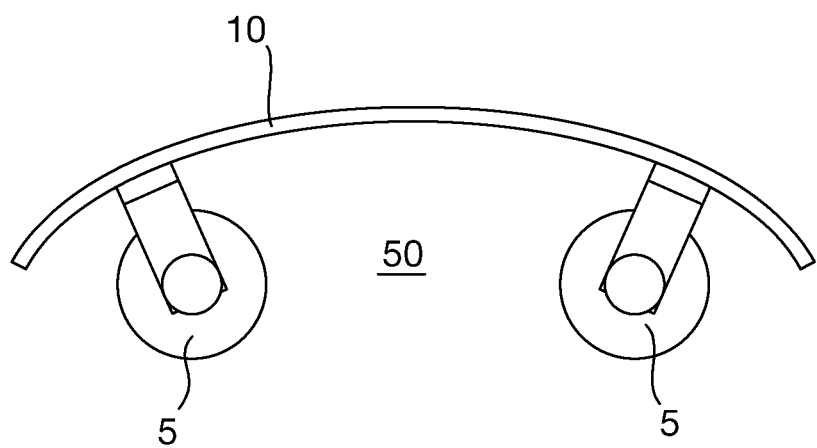

As shown in FIG. 3, depending upon the orientation and position of the supports 5 on the surface 50, the screen 10 may take the form of a straight line (FIG. 3A) or an arc (FIG. 3B). Since the supports 5 are spaced apart, and may be at, or close to, opposite sides of the screen 10, the portable screen apparatus 1 may be placed directly onto the a surface of a workpiece without impeding the welding (or grinding or cutting) operation being carried out.

The skilled person will appreciate that modifications can be made to the above embodiment. For example, while the attachment device 15 in the illustrated embodiment is rigidly attached to support 5, in other embodiments the attachment device 15 may be adjustable or may have a predetermined range of motion to enable self alignment. The skilled person will appreciate that the welding screen apparatus of embodiments of the invention may also be suitable for use in other metalworking operations, such as grinding or cutting.

The embodiment described above provides a portable work/safety screen apparatus which, in use, can be attached directly to the article being processed, or to a neighbouring structure. This can allow a more compact screen to be used without compromising safety. The portable screen apparatus can be particularly advantageous when working in confined spaces.

The invention claimed is:

1. A portable work screen apparatus comprising:
   a semi-rigid screen; and
   at least two supports, each of said at least two supports comprising:
   a base portion including an attachment device that defines an attachment plane for mounting to a surface, said attachment device having a magnet for releasably connecting the semi-rigid screen to the surface;
   an arm mounted to said semi-rigid screen and extending from said base portion in substantially perpendicular alignment to the attachment plane of said attachment device, said semi-rigid screen extending at least to the attachment plane;
   a handle constructed and arranged to effect positioning and releasable connection of a corresponding support to the surface such that said semi-rigid screen extends between said at least two supports in one of a plurality of different therebetween flexed configurations.

2. The portable work screen apparatus according to claim 1, wherein each of said at least two supports have an L-shaped profile.

3. The portable work screen apparatus according to claim 1, wherein the handle of each of the at least two supports is aligned with the attachment device.

4. The portable work screen apparatus according to claim 1, wherein the semi-rigid screen is at least partially transparent.

5. The portable work screen apparatus according to claim 1, wherein the screen is releasably fastened to each of the at least two supports.

6. The portable work screen apparatus according to claim 1, wherein said semi-rigid screen is removably mounted to said base portion.

7. The portable work screen apparatus according to claim 1, wherein the semi-rigid screen comprises a plastic sheet.

8. The portable work screen apparatus according to claim 7, wherein the plastic sheet screen comprises: acetate.

9. A portable work screen apparatus comprising:
   a semi-rigid screen; and
   at least two supports, each of said at least two supports including an L-shaped profile and comprising:
   a base portion of each L-shaped profile connected to an attachment device that defines an attachment plane for mounting to a surface, said attachment device having a magnet for releasably connecting the semi-rigid screen to the surface;
   an arm of each L-shaped profile mounted to said semi-rigid screen and extending from said base portion in substantially perpendicular alignment to the attachment plane of said attachment device, said semi-rigid screen extending at least to the attachment plane;
   a handle constructed and arranged to effect positioning and releasable connection of a corresponding support to the surface such that said semi-rigid screen extends between said at least two supports in one of a plurality of different therebetween flexed configurations, wherein the handle of each of the at least two supports is centrally aligned with the attachment device.

* * * * *